United States Patent
Bisale et al.

(10) Patent No.: US 12,362,932 B2
(45) Date of Patent: Jul. 15, 2025

(54) METHOD FOR REGISTERING A DEVICE WITH A COMPUTING FACILITY, COMMUNICATION SYSTEM AND ENERGY SUPPLY NETWORK

(71) Applicant: SIEMENS AKTIENGESELLSCHAFT, Munich (DE)

(72) Inventors: Chaitanya Bisale, Nuremberg (DE); Wiebke Froehner, Amberg (DE); Thomas Vogl, Erlangen (DE); Thomas Werner, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 46 days.

(21) Appl. No.: 16/944,722

(22) Filed: Jul. 31, 2020

(65) Prior Publication Data

US 2021/0044438 A1 Feb. 11, 2021

(30) Foreign Application Priority Data

Aug. 5, 2019 (EP) .................................... 19190066

(51) Int. Cl.
*H04L 9/32* (2006.01)
*G06F 21/31* (2013.01)
*H04L 9/08* (2006.01)
*H04W 12/37* (2021.01)

(52) U.S. Cl.
CPC ............... *H04L 9/32* (2013.01); *G06F 21/31* (2013.01); *H04L 9/0819* (2013.01); *H04W 12/37* (2021.01)

(58) Field of Classification Search
CPC ........ H04L 9/32; H04L 9/0819; H04W 12/37; G06K 7/1417
See application file for complete search history.

(56) References Cited

U.S. PATENT DOCUMENTS

| | | | |
|---|---|---|---|
| 10,073,429 B2 | 9/2018 | Froehner et al. | |
| 2009/0282246 A1* | 11/2009 | Gunther | H04L 63/062 713/168 |
| 2014/0173700 A1* | 6/2014 | Awan | H04L 63/107 726/4 |
| 2015/0046698 A1* | 2/2015 | Dadu | G06F 21/88 713/155 |
| 2015/0117639 A1* | 4/2015 | Feekes | H04L 9/16 380/28 |

(Continued)

FOREIGN PATENT DOCUMENTS

| | | | | |
|---|---|---|---|---|
| CN | 107920081 A | * | 4/2018 | ........... H04L 63/083 |
| CN | 109479194 A | * | 3/2019 | ........... H04L 63/123 |

(Continued)

*Primary Examiner* — Benjamin E Lanier
(74) *Attorney, Agent, or Firm* — Laurence A. Greenberg; Werner H. Stemer; Ralph E. Locher

(57) ABSTRACT

A method for registering a device with a connected computing facility includes registering the device with the computing facility by using a first encryption method, defining, in the computing facility, a user-specific and device-specific second encryption method based on device identification data and user identification data, and communicating the second encryption method from the computing facility to the device for future communication. A communication system and an energy supply network are also provided.

17 Claims, 2 Drawing Sheets

(56) References Cited

U.S. PATENT DOCUMENTS

| | | | | |
|---|---|---|---|---|
| 2015/0363607 A1* | 12/2015 | Yang | ....................... | H04L 9/085 |
| | | | | 713/165 |
| 2016/0255610 A1* | 9/2016 | Li | ........................ | H04L 1/0083 |
| | | | | 370/329 |
| 2016/0274557 A1* | 9/2016 | Froehner | ............ | G05B 19/0426 |
| 2017/0134182 A1* | 5/2017 | Davis | .................... | G01D 4/006 |
| 2018/0206122 A1* | 7/2018 | Bradley | ..................... | H04L 9/32 |
| 2018/0208448 A1* | 7/2018 | Zimmerman | ........ | G06K 7/1417 |
| 2018/0314847 A1* | 11/2018 | Yeo | ....................... | H04L 63/062 |
| 2019/0199521 A1* | 6/2019 | Sayers | ..................... | H04L 9/14 |

FOREIGN PATENT DOCUMENTS

| | | | | | |
|---|---|---|---|---|---|
| CN | 109600354 A | * | 4/2019 | ........... | H04L 63/083 |
| CN | 110022206 A | * | 7/2019 | ........... | H04L 9/0844 |
| EP | 2506392 A1 | | 10/2012 | | |
| EP | 2579417 A1 | | 4/2013 | | |
| EP | 3070556 A1 | | 9/2016 | | |
| WO | WO2018184805 A1 | | 10/2018 | | |
| WO | WO-2018192513 A1 | * | 10/2018 | ............. | H04L 29/06 |

* cited by examiner

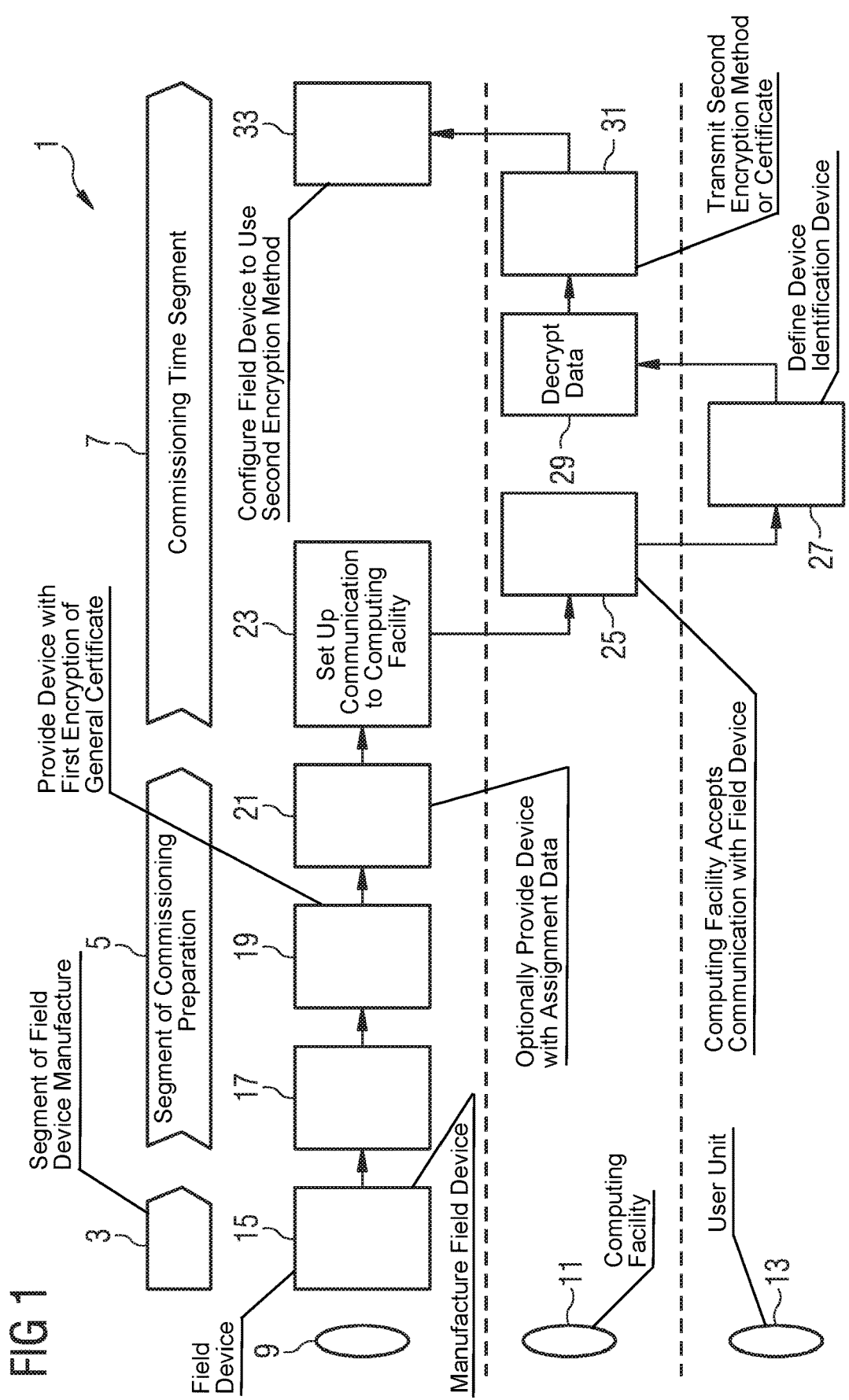

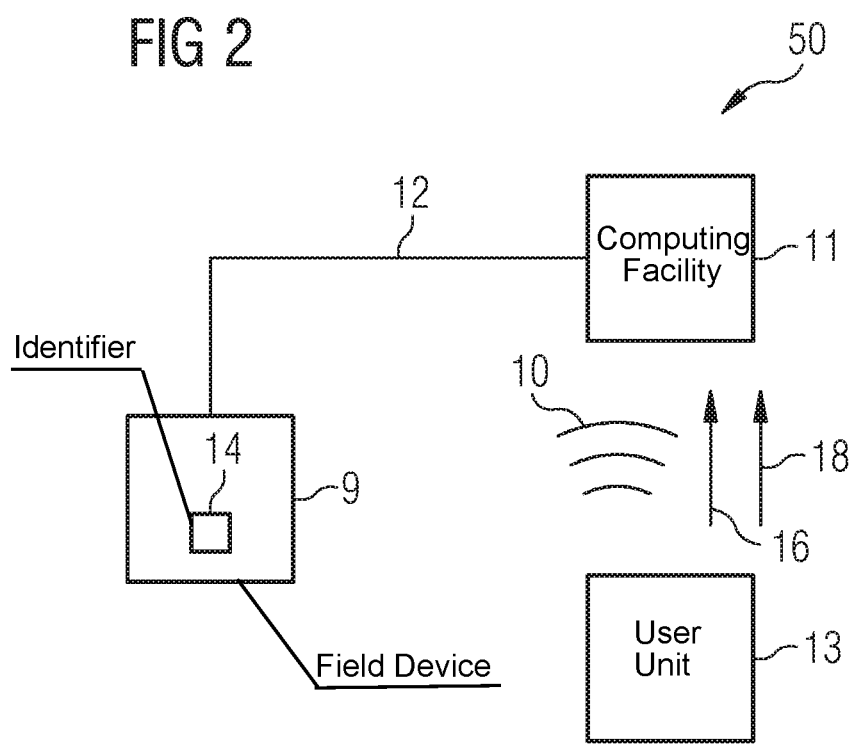

METHOD FOR REGISTERING A DEVICE WITH A COMPUTING FACILITY, COMMUNICATION SYSTEM AND ENERGY SUPPLY NETWORK

CROSS-REFERENCE TO RELATED APPLICATION

This application claims the priority, under 35 U.S.C. § 119, of European Patent Application EP19190066, filed Aug. 5, 2019; the prior application is herewith incorporated by reference in its entirety.

BACKGROUND OF THE INVENTION

Field of the Invention

The present invention relates to a method for registering a device with a computing facility connected in a communication network. The invention further relates to a communication system which has a device and a computing facility, and the invention also relates to an energy supply network which has the communication network.

The automation of electrical energy supply networks has been increasing continuously in recent years. Whereas energy supply networks have heretofore been extensively equipped with automation systems largely in the high-voltage range only and also partially in the medium-voltage range, increasing efforts have recently been made to automate distribution networks at the medium-voltage and low-voltage levels as well. Network operators expect, in particular, a reduction in outage times as a result. Existing energy supply networks, particularly at the distribution level as well, must further be upgraded to cope with a constantly increasing feed-in of electrical energy from decentralized generating plants (e.g. wind power, photovoltaic, biomass power stations, etc.). Consequently, automation systems have been created which are distinguished above all in that they include a very large number of electrical devices, in particular actuators and sensors, are spatially distributed over large areas and collect a large amount of data.

Automation solutions which are configured according to a conventional pattern with few central management and control devices and distributed automation devices or tele-control devices connected thereto require a considerable installation and parameterization outlay. Due to the large number of devices in future automation systems, the question arises as to how the required registration of the devices can be undertaken as error-free as possible, and also simply and economically.

European Patent Application EP 3 070 556 A1, corresponding to U.S. Pat. No. 10,073,429, discloses a method, a computing facility and a system for parameterizing an electrical device, wherein a parameterization program for parameterizing the electrical device is provided by the computing facility and a parameterization of the electrical device is performed.

For a provider of cloud services or communication-network-based services, e.g. MindSphere, it is urgently required for the successful creation of a cloud-based business to configure the login process or registration process of field devices, in particular energy automation devices, as simply as possible. The simpler this login process or registration process is, the sooner the purchaser or user of the device will be able to be connected to the cloud service or the cloud user will be motivated to purchase specific selected devices.

For the login or registration of field devices to or with a specific cloud service such as e.g. MindSphere and EnergyIP, a plurality of work steps must be completed before the device can be used by, in particular client-specific, applications which run in the cloud system.

Conventionally, the device must first be enabled to communicate with the cloud system. In order to do this, the communication facility of the field device can be preconfigured and parameterized in such a way that it can set up the communication to the cloud platform. Even this first communication must be performed in a secure manner, since the field devices are frequently part of a critical infrastructure.

After the communication has been set up to the cloud service, the device must be assigned to the correct user or user group (in this application also referred to as the client) in the cloud service. Finally, the communication must be secured so that only the client of the cloud service can read the information which is exchanged between the cloud service and the energy automation device.

Registration procedures for field devices have conventionally been performed manually by the commissioning technicians using corresponding configuration and parameterization tools. That conventional configuration and parameterization is time-consuming and requires a good understanding by the technicians of the information and communication technology that is used. Operating errors can further occur which hinder a fast deployment of the field device.

BRIEF SUMMARY OF THE INVENTION

It is accordingly an object of the invention to provide a method for registering a device with a computing facility, which overcomes the hereinafore-mentioned disadvantages of the heretofore-known methods of this general type, which runs quickly and reliably and is simply constructed. A further object of the present invention is to propose a method of this type which can ideally be implemented by using conventionally available hardware. Another object of the present invention is to provide a corresponding communication system from a device in a computing facility which is configured to carry out the registration method. Another further object of the present invention is to propose an energy supply network which simplifies and speeds up a registration or login of field devices.

With the foregoing and other objects in view there is provided, in accordance with the invention, a method for registering a device with a computing facility connected in a communication network (e.g. cloud system), comprising registering the device with the computing facility using a first encryption method (e.g. key pair A with certificate A); defining, in the computing facility, a user-specific and device-specific second encryption method (e.g. key pair B with certificate B) based on device identification data and user identification data; and communicating the second encryption method from the computing facility to the device for future communication.

The method can be carried out partially by the device and partially by the computing facility and parts of the communication network. The device can be an electrical device, in particular a field device, which is provided for monitoring, controlling or automating a system, for example an energy supply network. The communication network can include a line-based or wireless communication network. The communication network can have different topologies, e.g. a ring topology, star topology or a hybrid thereof.

The computing facility can be configured, for example, as a computer server or a computer system having an arithmetic-logic processor or an array of arithmetic-logic processors. The computing facility can have storage facilities in the form of an electronic memory. In particular, the computing facility can have a storage area which can be divided into specific usage areas for a multiplicity of users by using software or hardware.

The computing facility can be a single data processing facility or a multiplicity of data processing facilities (computers, servers, etc.) which interwork in a suitable manner to run the parameterization program. A wired or wireless communication connection preferably exists between the computing facility and the electrical device. This can be permanently present or can be set up on demand. The computing facility can further have an interface to an operating and monitoring station (e.g. a computer in a control center, a mobile computer, a smartphone or a workstation) in order to be able to display data relating to and/or supplied by the electrical device to the operator of the electrical device.

The registration of the device can also be regarded as a login of the device to the computing facility, wherein the computing facility is informed of the presence of the device and, in particular, can receive device identification data for identifying the device. The computing facility can identify the device type and the functions which the device can perform on the basis of the device identification data (for example by using a query in a database). A set of commands understandable by the device can also be retrieved by the computing facility, e.g. from the device itself or from a database on the basis of the device identification.

The device can be provided with user identification data during manufacture or during a configuration prior to the registration, but does not have to be provided with the user identification data if it is registering with the computing facility for the first time. User identification data can be forwarded to the computing facility through further optional steps of the method.

The first encryption method can be defined by a specific (symmetric or asymmetric) encryption method and one or more keys, e.g. public keys and private keys. The encryption method enables encrypted and integrity-protected transmission of data between the device and the computing facility during the registration process. However, after the second encryption method has been defined and has been communicated by the computing facility to the device for future communication and/or has been parameterized, the device and also the computing facility can be made to communicate with one another exclusively using the second encryption method. The second encryption method can be defined by the same or by a different encryption method and by different keys or different key pair(s) with different certificates. The communication can take place e.g. through FTP, http, SSL/TLS or other communication technologies. The communication can take place in a wired or wireless manner. Combined forms of wireless and wired transmission are also possible.

In this context, electrical devices can, in particular, be devices of an automation system, e.g. sensors, actuators, fault indicators, measuring devices, protective devices, control devices or communication facilities (routers, switches, hubs, bridges). The automation system can be used for the control, observation, monitoring, protection and/or regulation of industrial processes and systems, production and manufacturing plants, public and private facilities (e.g. buildings, traffic systems) or distribution and transport systems (e.g. for electrical energy, solids, oil, gas, water, air, etc.). However, any other electrical devices, e.g. devices from the consumer sector, can also be subjected to a parameterization. The invention is explained below by using the example of an automation system for an electrical system, such as e.g. an electrical energy supply network or an electrical switching station in an energy supply network. An electrical system of this type can include individual components, for example in the form of lines and cables, switches, transformers, generators, motors, inverters, loads, electrical energy generators, etc. Electrical devices in an automation system of this type can be disposed in spatial proximity to individual components of the electrical system and can serve, for example, to capture measured values which describe a state of the respective components of the system, or to influence states of respective components of the system. In this context, the electrical devices can, for example, be sensors, e.g. sensors for measuring electrical quantities (e.g. current, voltage), temperature sensors, flow sensors, throughput sensors, flow sensors, etc., or actuators, e.g. final control elements, valves, etc. In addition, electrical devices can also be intelligent devices (e.g. IEDs—intelligent electronic devices) which independently perform system automation tasks while executing specific algorithms (e.g. fault indicators which measure current flowing in a line and emit an alarm signal if a threshold value is exceeded). In this context, IEDs can be protection and control devices, measuring devices, power quality devices or power-measuring devices (power meters). Electrical devices in an automation system of this type can further also be communication devices (routers, switches, etc.) which serve to transmit messages in a communication system of the automation system.

Once the device is logged in to the computing facility and the second encryption method has been communicated to the device and/or parameterized, control commands or configuration commands, for example, can be forwarded from the computing facility to the device using the second encryption method. Measuring data or monitoring data generated by the device can similarly be forwarded from the device to the computing facility using the second encryption method. The second encryption method can thus define the type of the encryption in both directions between the device and the computing facility. The authorized user (e.g. a user or an automated service) which is identified by the user identification data can communicate through the computing facility with the device similarly using the second encryption method. Since corresponding keys must be known for the successful performance of the second encryption method, unauthorized users can be prevented from communicating with the device through the communication facility. A secured communication with authorized users only can thus be set up to the device and maintained.

According to one embodiment of the present invention, the method further includes preventing any communication of any user with the device through the computing facility if no user identification data have been transmitted from the device to the computing facility during the registration. Since the communication with the device is performed by the device or by the computing facility only by using the second encryption method, any user which does not know the details of the second encryption method, in particular the key(s), is excluded from a communication with the device. It can thus be ensured that only the authorized user (or an authorized user group) can communicate with the device assigned to it. Only the authorized user (or an authorized user group) can have the corresponding key(s) and details of the encryption method that is used in order to be able to access the data of the device assigned to it.

According to one embodiment of the present invention, the registration includes a transmission of device identification data, which identify the device, from the device to the computing facility. The device identification information may, for example, be a device name, a serial number, a device type, etc. The device identification data can be transmitted or forwarded directly from the device to the computing facility. In other embodiments, a user unit, e.g. a mobile device, can transmit the device information data to the computing facility. The user unit can read, e.g. by using an optical sensor, an identification code which is fitted to the electrical device. A device-specific encryption, i.e. the second encryption method, can be defined by using the device identification data.

According to one embodiment of the present invention, the method further includes capturing, in the device, the device identification data which identify the device; and forwarding the device identification together with user identification data which identify an authorized user to the computing facility.

The device identification data can be captured e.g. by a user unit, e.g. a mobile device. The user unit can also be used to forward the device information data together with user identification data to the computing facility. The user unit may have stored user identification data in a memory for this purpose. If the device identification data are forwarded together with the user identification data to the computing facility, a secure assignment of the device to a user or user group can be performed and the second encryption method can be defined in a user-specific and device-specific manner. User-specific and device-specific can mean that the second encryption method depends on both the user identification data and the device identification data and that, for example, user identification data which identify a different user result in a different encryption method. Device identification data which identify a different device can also result in an encryption method other than the second encryption method.

According to one embodiment of the present invention, capturing the device identification data includes scanning a code fitted to the device, in particular a QR code. Conventional codes can thus be advantageously used in the method. Scanners or readers of such codes are conventionally available.

According to one embodiment of the present invention, the device identification data are captured by a user unit, particularly a mobile device, more particularly a smart cell phone, and are forwarded to the computing facility together with the user identification data which is stored, in particular, on the user unit. The user unit can, in particular, be carried by an employee working for the authorized user and can be brought toward the device in order to capture the device identification data of the device (e.g. by using a camera and image-processing software). In other example embodiments, a robot or unmanned vehicle, for example, can be brought toward the device, can record the device identification data and can forward that device identification data together with the user identification data to the computing facility.

According to one embodiment of the present invention, the method further includes enabling a communication of the authorized user with the device through the computing facility using the second encryption method; and preventing any communication of a user other than the authorized user with the device through the computing facility.

Any communication with an encryption method other than the second encryption method can be prevented between the authorized user or any other user and the device through the computing facility. The authorized user does not communicate directly with the device without involving the computing facility, but rather only through the computing facility. For the transmission of data to the device, the authorized user transmits these data (or data derived therefrom) to the computing facility which forwards the data (or derived data) to the device. For the reception of data from the device, the device transmits data to the computing facility which forwards the data (or data derived therefrom) to the authorized user. The authorized user can use a corresponding communication device, e.g. a computer or smartphone, for the communication. The second encryption method can be known only to the authorized user and to the device. The second encryption method (or in any event the corresponding key or key pair) does not need to be known to other users or other devices.

The computing facility can provide the device and the authorized user with an assigned memory area which the device and the authorized user can access for reading and/or writing. The memory area assigned to the authorized user and to the device can also contain software which can be used e.g. to control or configure the device. Data captured by the device in the past, for example, or commands issued in the past by the authorized user can also be stored in the reserved memory area which is assigned to the device and to the authorized user. Correspondingly, any communication of a user other than the authorized user wishing to access the memory area reserved for the device and the user can also be prevented. Data security can thus be achieved.

According to one embodiment of the present invention, enabling the communication of the authorized user with the device through the computing facility includes: configuring the device to communicate with the computing facility and/or the authorized user in the future exclusively by using the second encryption method.

The device can have a communication interface or a communication module which is configurable. Configuring the device can include e.g. exchanging a first key (pair) and the corresponding certificate for a second key (pair) and the corresponding certificate. The first encryption method and/or the second encryption method can include e.g. an asymmetric encryption method, wherein public keys are exchanged in each case between the device and the authorized user or between the device and the computing facility. The device can send e.g. data following encryption with the public key of the computing facility to the computing facility, whereupon the computing facility can decrypt these data encrypted with its public key with the private key of the computing facility. The computing facility can transmit e.g. data which are encrypted with the public key of the device to the device which can decrypt these encrypted data using the private key of the device. Public keys which are to be used according to the second encryption method can similarly have been exchanged between the computing facility and the authorized user.

The first encryption method and/or the second encryption method can thus be defined in each case by four key pairs. Two key pairs can in each case define the communication between the device and the computing facility. Two different key pairs can define the communication between the authorized user and the computing facility.

According to one embodiment of the present invention, prior to the registration, the method includes preparing the device for the encrypted communication with the computing facility, including providing the device with the first encryption method (e.g. with certificate A). Providing the device with the first encryption method can include e.g. storing a key pair (public key of the computing facility and private key of the device) generated within the device or imported, and storing the corresponding signed certificate, in particular certificate A. Certificate A can be signed by the certification body of the device manufacturer. This preparation can thus be undertaken prior to commissioning of the device in the field. The device does not therefore need to communicate with the computing facility in order to obtain knowledge of the first encryption method. The registration process or login process can therefore be further simplified and speeded up.

According to one embodiment of the present invention, preparing the device further includes: storing, on the device, the user identification data which identify an authorized user or an authorized user group, wherein the registration includes transmitting the user identification data from the device to the computing facility. If the user identification data are already held, in particular stored, on the device during the preparation of the device, the device can already be assigned to the authorized user without further method steps. The device can thus be assigned more quickly to the memory area reserved for the corresponding authorized user within the computing facility (or within the communication network).

According to one embodiment of the present invention, the first encryption method and the second encryption method both use the same, in particular symmetric or asymmetric, encryption method, but different keys and/or a first certificate or a second certificate.

Certificate A is e.g. the device manufacturer's certificate which has been signed by the device manufacturer's certification body and has therefore been legitimized. It contains e.g. at least the core device identification data such as the serial number, etc., and also the public key of the device key pair. The corresponding private key is, for example, stored securely in the device and is never disclosed to external participants of any type.

The device can identify itself e.g. to the computing facility, with the certificate A. A precondition for this is e.g. that the device manufacturer's certification body has been parameterized in advance in the computing facility as trusted. The computing facility can thus check during a connection request from the device whether the request originates from a trusted device, in other words whether the device certificate received during the connection set-up has been signed e.g. by a trusted certification body.

Following the successful connection set-up of the device with the computing facility or following the successful assignment of the device to the quarantine area on the part of the computing facility, the certificate A and the associated keys have fulfilled their purpose. The computing facility can now initialize the device with a new key pair and the corresponding certificate, "certificate B," which is signed by the user's certification body, and can thus allow the device to access the user-specific memory area through the user-specific services running there. From this time on, the device identifies itself to the computing facility e.g. exclusively by using certificate B.

If the same encryption method is used, a switchover from the first encryption method to the second encryption method can be performed simply and quickly. In particular, the same software can run for the first encryption method and the second encryption method, thus reducing the implementation requirement.

According to one embodiment of the present invention, following the registration, the method further includes parameterizing and/or configuring the device using the second encryption method from the computing facility, in particular interworking with the mobile device. The parameterization and/or configuration of the device can set the device for application-specific tasks, e.g. in terms of measuring physical quantities, e.g. current, voltage, or in terms of controlling components of the device, e.g. switches, transformers, converters, etc. The parameterization or configuration can also include exchanging control or measurement software which is tailored to the desired application.

According to one embodiment of the present invention, the device includes a field device, in particular one of the following: a sensor, an actuator, a measuring device, a protective device, a control device, a communication device, a switch. A plant or an industrial plant can thus be advantageously monitored and/or controlled and/or automated. The device can have a communication module which is configured to perform one or more encryption communication techniques. The communication module can be configured to communicate with the computing facility according to the first or the second communication or encryption method.

According to one embodiment of the present invention, the communication network and/or the computing facility is/are configured to control and/or monitor and/or automate an electrical energy supply network.

It should be understood that features that have been described, explained or used individually or in any combination in connection with a method for registering a device with a computing facility are similarly applicable individually or in any combination to a communication system according to embodiments of the present invention, or vice versa.

With the objects of the invention in view, there is also provided a communication system, comprising a device; and a computing facility which is connected to the device through a communication network, wherein the device is configured to register with the computing facility using a first encryption method (e.g. certificate A); wherein the computing facility is configured to define a user-specific and device-specific second encryption method (e.g. certificate B) based on device identification data and user identification data; and to communicate the second encryption method for future communication to the device. The communication system can be configured, in particular, to carry out a method for registering a device with a computing facility according to one embodiment of the present invention.

According to one embodiment of the present invention, the communication system further has a mobile user unit, in particular a smart cell phone, which is configured to capture device identification data of the device and forward that data together with user identification data to the computing facility. The user unit may, for example, be a portable computer (notebook, laptop, tablet, PDA, etc.) or a mobile communication device (cell phone, smartphone, etc.). However, the user unit may also be a stationary data processing facility, e.g. a workstation.

With the objects of the invention in view, there is concomitantly provided an energy supply network, comprising: a communication system according to one of the preceding embodiments and a heavy-current network for the energy supply of a plurality of consumers, wherein the device of the system is connected to the heavy-current network for control and/or monitoring and automation.

Other features which are considered as characteristic for the invention are set forth in the appended claims.

Although the invention is illustrated and described herein as embodied in a method for registering a device with a computing facility, a communication system and an energy supply network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a flow diagram of a method for registering a device with a computing facility according to one embodiment of the present invention; and FIG. 2 is a block diagram of a system according to one embodiment of the present invention which is constructed to carry out the method illustrated in FIG. 1.

DETAILED DESCRIPTION OF THE INVENTION

Referring now to the figures of the drawings in detail and first, particularly, to FIG. 1 thereof, there is seen a schematically illustrated flow diagram 1 of a method for registering a device with a computing facility according to one embodiment of the present invention including a segment 3 of a manufacture of a field device, a segment 5 of a preparation of the commissioning of the device (e.g. in the factory of a value-added reseller, etc.) and a time segment 7 of a commissioning of the field device (e.g. in the field). The segments 3, 5, 7 run in temporal succession. The method steps which are carried out by a field device 9, by a computing facility 11 (or cloud service) or by a user unit 13 (e.g. mobile device) are illustrated in each case below the segments 3, 5, 7.

The field device 9 is first manufactured in the block 15 which takes place within the manufacturing segment 3. Method steps 17, 19 and 21 are carried out in segment 5 of the preparation of the commissioning. In method step 17, a configuration and parameterization are performed in the field device 9 for the communication with the computing facility 11 (or with the cloud service). In the following method step 19, the device 9 is provided with a first encryption method or with a general certificate A (e.g. signed by the device manufacturer), including the associated key pair. In an optional method step 21, the device is provided with data which later enable an assignment to an authorized user (or client).

In segment 7 of the commissioning, both the field device 9 and the computing facility 11 and also the user unit 13 carry out at least one method step. In method step 23, communication is set up to the computing facility 11 or to the cloud service when the field device 9 is started up. For this purpose, the first encryption method or the general certificate "A" is used for secure data transmission or communication. In method step 25 carried out by the computing facility 11, the computing facility 11 accepts the communication with the field device 9 and a data object of the device relating to the field device 9 is stored in a quarantine area. The quarantine area designates a memory area of the computing facility 11 which cannot be accessed by any user from outside. However, this takes place only if optional method step 21 has been omitted and the device cannot be assigned to an authorized user at this time. If optional method step 21 has actually been carried out, a method step (not illustrated) is carried out, wherein the data object relating to the field device 9 is stored in a memory area assigned to the corresponding authorized user. Both the device 9 and the respective authorized user or user group can access this memory area assigned to the authorized user in order e.g. to control the device or receive data from it.

However, if optional method step 21 has not been carried out, the designation of the field device is recorded, in particular device identification data are defined, by a user unit 13 in a method step 27. This device identification information is further encrypted with a certificate of the user unit 13 and is transmitted to the computing facility 11 or to the cloud service. In a following method step 29, the computing facility then decrypts the data received from the user unit 13 and moves the data object relating to the field device 9 into the memory area within the computing facility 11 predefined for the authorized user. The device 9 is now assigned to a unique authorized user and can be contacted by the authorized user in order, for example, to retrieve data or transmit control commands. In a method step 31, the computing facility initiates the transmission of a user-specific second encryption method or a user-specific certificate B (e.g. signed by the user's certification body) to the field device 9 for the communication between the device 9 and the authorized user. In this step of transmitting the certificate B, either the corresponding key pair must also be transmitted to the field device 9 or the key pair can also be generated directly in the device under the management of the computing facility. In the latter case, the certificate B is also first generated in the device and forwarded to the computing facility for signing so that the certificate B is signed and returned by the user certification body.

In the following method step 33, the field device 9 is configured to use the second encryption method in the future for communication with the computing facility 11 and/or the authorized user. In particular, the field device can exchange the previous certificate A and the corresponding key pair for the certificate B and the corresponding key pair in order to perform the future communication using the certificate B and the corresponding key pair.

FIG. 2 illustrates schematically a communication system 50 according to one embodiment of the present invention which includes a device 9, a computing facility 11 which is connected to the device through a communication network 12, and a user unit 13. The field device 9 has an identifier 14 which can be scanned by using the user unit 13. The user unit 13 then forwards the device identification data 16 derived from the identifier 14 to the computing facility 11, for example through wireless transmission 10. User identification data 18 which identify the authorized user are also forwarded from the user unit 13 to the computing facility 11.

According to embodiments of the present invention, it is proposed to protect the login or registration of field devices (e.g. field device 9) to/with a specific cloud system (e.g. MindSphere) or to/with a computing facility 11 by using encryption methods or keys and certificates. A first encryption method or first, general certificate A (e.g. signed by the device manufacturer's certification body) is initially used during the process. This certificate is exchanged during the process for a second encryption method specific to the authorized user or a user-specific certificate B (e.g. signed by the user's certification body). Following the manufacturer of the field device 9 in method step 15, the device is prepared in a first phase for the subsequent commissioning in the communication network or in the cloud. For this purpose, the device 9 is first provided with a general certificate A (as an example of a first encryption method) and is configured and parameterized in such a way that it can set up a communication to the computing facility 11 or the cloud system during the commissioning and can log in there. According to one embodiment, the device manufacturer's certification body must be stored as trusted in the cloud system, so that the connection request from the device is acknowledged by using identification by certificate A.

During the commissioning (see method segment 7 in FIG. 1) in the field, the device 9 first logs in to the computing facility 11 or the cloud system using the first encryption method or by using the certificate A in order to be registered there. The computing facility 11 or the cloud system acknowledges the device on the basis of the first encryption method that is used or on the basis of the certificate A, permits the communication with this device and creates a data object for the device in a secured quarantine area in the computing facility 11 or in the cloud system. Data objects in this quarantine area cannot initially be available to the applications in the cloud system or in the computing facility 11. The data objects can initially only be created and wait to be moved into an area of the computing facility 11 (or into a memory area of the computing facility 11) which is uniquely assigned to an authorized user or client and which the applications running in the cloud service or the applications running in the computing facility 11 can access.

In method step 27, a commissioning technician can record a unique identifier of the device 9 with a user unit (e.g. a mobile device), e.g. by scanning a QR code, can encrypt data with his or her own certificate (or with his or her own encryption method) and can transmit it to the computing facility or to the cloud.

After the data object which relates to the device 9 has been moved to the correct memory area or the memory area assigned to the authorized user, the computing facility 11 or the cloud system initiates an exchange of the first encryption method for a second encryption method or initiates a certificate exchange for the device 9. In order to do this, a definition or information relating to the second encryption method or a second certificate B (and a corresponding key pair) is transmitted to the device 9 which is specific to the authorized user or belongs to the corresponding client. The device acknowledges the validity of the second encryption method or the validity of the certificate B on the basis of the first encryption method or on the basis of the first certificate A and exchanges the first encryption method for the second encryption method or exchanges the certificate A (and the corresponding key pair) for the certificate B (and the corresponding key pair). The process of the certificate exchange or exchange of the encryption methods can be performed either directly from the cloud system or from an administration system connected by the cloud system.

The communication between the device and the computing facility 11 or the cloud system will henceforth be carried out only using the second encryption method or will be encrypted only with the certificate B.

Alternatively, it can be provided that the encryption method is first exchanged or the certificate is exchanged and the data object is then moved from the quarantine area into the user-specific area.

According to one embodiment of the present invention, it is further provided that a distinction is made in the preparation of the commissioning between devices for which the authorized user to which they are assigned is known and devices in respect of which this is not yet known during the preparation.

If the authorized user or client to which the device will later belong is already known in the preparation, the device is additionally provided with an identifier which is specific to this authorized user or to the client (see optional method step 21 in FIG. 1). The device 9 can additionally use or send this identifier during the first login (see method step 23 in FIG. 1) to the computing facility 11 or to the cloud service. The computing facility 11 or the cloud service can use this information to create the data object for the device in a quarantine area reserved for the authorized user which is reserved exclusively for the authorized user or the client. Data objects of further devices which are assigned to this user or to the client can be present in this area.

If the device logs in without a specific client or user identifier, it is moved into a general quarantine area, as described above, in which devices of different clients or users can be present.

Embodiments of the present invention can provide the following advantages or features:

The method can permit a simple and fast login of a field device to a computing facility or to a cloud service with a minimum of operating outlay. A communication secured by asymmetric keys and certificates or other encryption methods can take place at any time between the field device and the computing facility or the cloud service. Not only field devices in respect of which the user to which they must be assigned is known at the time of the preparation of the commissioning, but also field devices in respect of which this is not known can be logged in to the computing facility 11 or to the cloud service. The preparation of the commissioning can be undertaken by different user groups in manufacturing, delivery and commissioning processes. The preparation can be carried out in the factory during manufacture, on the premises of a value-added reseller or in the work preparation of the end customer.

The invention claimed is:

1. A method for registering a device with a connected computing facility, the method comprising the following steps:
   registering the device with the computing facility using a first encryption method;
   defining, in the computing facility, a user-specific and device-specific second encryption method being different than the first encryption method and being based on and dependent on both device identification data and user identification data;
   using the second encryption method instead of and after the first encryption method for future communication from the computing facility to the device;
   the first encryption method and the second encryption method being used by the same user; and
   at least one of the first encryption method or the second encryption method being an asymmetrical encryption method.

2. The method according to claim 1, which further comprises, if no user identification data have been transmitted from the device to the computing facility during the registration:
   preventing any communication of any user with the device through the computing facility.

3. The method according to claim 1, which further comprises carrying out the registration by using the user unit to transmit device identification data, which identify the device, to the computing facility.

4. The method according to claim 1, which further comprises:
   capturing, in the device, the device identification data which identify the device; and
   forwarding the device identification data, together with user identification data, which identify an authorized user, to the computing facility.

5. The method according to claim 4, which further comprises carrying out the capturing of the device identification data by scanning a code or a QR code, fitted to the device.

6. The method according to claim 4, which further comprises using a mobile user unit or a smart cell phone to capture the device identification data, and forwarding the device identification data together with the user identification data stored on the user unit to the computing facility.

7. The method according to claim 1, which further comprises:
   using the second encryption method to enable a communication of the authorized user with the device through the computing facility; and
   preventing any communication of a user other than the authorized user with the device through the computing facility.

8. The method according to claim 7, which further comprises carrying out the enabling of the communication of the authorized user with the device through the computing facility by:
   configuring the device to communicate with at least one of the computing facility or the authorized user in the future exclusively by using the second encryption method.

9. The method according to claim 1, which further comprises, prior to the registration:
   preparing the device for the encrypted communication with the computing facility, including providing the device with the first encryption method.

10. The method according to claim 9, which further comprises carrying out the preparing of the device by:
    storing, on the device, the user identification data or user group identification data which identify an authorized user; and
    carrying out the registration by transmitting the user identification data from the device to the computing facility.

11. The method according to claim 1, which further comprises using an identical symmetric or asymmetric encryption method for the first encryption method and the second encryption method, but using at least one of different keys or a first certificate or a second certificate.

12. The method according to claim 1, which further comprises, following the registration:
    at least one of parameterizing or configuring the device using the second encryption method from the computing facility or interworking with the user unit.

13. The method according to claim 1, which further comprises providing the device with an electrical device including:
    a sensor, an actuator, a measuring device, a protective device, a control device, a communication device or a switch.

14. The method according to claim 1, which further comprises configuring at least one of the communication network or the computing facility to at least one of control or monitor or automate an electrical energy supply network or other electrical systems.

15. A system, comprising:
    a device;
    a computing facility; and
    a communication network connecting said computing facility to said device;
    said device being configured:
      to register with said computing facility by using a first encryption method;
    said computing facility being configured:
      to define a user-specific and device-specific second encryption method being different than said first encryption method and being based on and dependent on both device identification data and user identification data, and
      to communicate to said device for future communication by using said second encryption method instead of and after said first encryption method; said first encryption method and said second encryption method configured to be used by the same user; and
    at least one of said first encryption method or said second encryption method being an asymmetrical encryption method.

16. The system according to claim 15, which further comprises a mobile user unit or smart cell phone configured to capture said device identification data of said device and to forward said device identification data together with said user identification data to said computing facility.

17. An energy supply network, comprising:
    a system including:
      a device;
      a computing facility; and
      a communication network connecting said computing facility to said device;
      said device being configured:
        to register with said computing facility by using a first encryption method;
      said computing facility being configured:
        to define a user-specific and device-specific second encryption method being different than said first encryption method and being based on and dependent on both device identification data and user identification data, and
        to communicate to said device for future communication by using said second encryption method instead of and after said first encryption method; and
      the first encryption method and the second encryption method configured to be used by the same user;
    a heavy-current network for energy supply of a plurality of consumers;
    said device of said system being connected to said heavy-current network for at least one of control or monitoring or automation; and
    at least one of the first encryption method or the second encryption method being an asymmetrical encryption method.

* * * * *